United States Patent
Ludwig et al.

(10) Patent No.: US 7,730,771 B2
(45) Date of Patent: Jun. 8, 2010

(54) DEVICE FOR DETECTING THE COMBUSTION-CHAMBER PRESSURE IN AN INTERNAL COMBUSTION ENGINE

(75) Inventors: Thomas Ludwig, Gerlingen (DE); Christoph Kern, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 10/591,924

(22) PCT Filed: Jan. 13, 2005

(86) PCT No.: PCT/EP2005/050123

§ 371 (c)(1), (2), (4) Date: May 14, 2007

(87) PCT Pub. No.: WO2005/085787

PCT Pub. Date: Sep. 15, 2005

(65) Prior Publication Data

US 2008/0028841 A1    Feb. 7, 2008

(30) Foreign Application Priority Data

Mar. 6, 2004    (DE) ...................... 10 2004 011 098

(51) Int. Cl.
*G01M 15/08* (2006.01)
(52) U.S. Cl. .................................. 73/114.19
(58) Field of Classification Search ............. 73/114.16, 73/114.18, 114.19, 114.21
See application file for complete search history.

(56) References Cited

U.S. PATENT DOCUMENTS

| | | | |
|---|---|---|---|
| 6,539,787 B1 * | 4/2003 | Murai et al. | 73/114.21 |
| 6,575,039 B2 * | 6/2003 | Murai et al. | 73/756 |
| 6,799,451 B2 * | 10/2004 | Kiess et al. | 73/35.07 |
| 6,948,372 B2 * | 9/2005 | Skinner et al. | 73/714 |
| 6,973,820 B2 * | 12/2005 | Watarai et al. | 73/35.13 |
| 7,201,043 B2 * | 4/2007 | Yamada et al. | 73/114.21 |
| 2001/0008090 A1 * | 7/2001 | Murai et al. | 73/756 |
| 2005/0061063 A1 * | 3/2005 | Haussner et al. | 73/116 |
| 2005/0252297 A1 * | 11/2005 | Heinzelmann et al. | 73/708 |
| 2006/0053875 A1 * | 3/2006 | Haussner et al. | 73/116 |
| 2007/0062267 A1 * | 3/2007 | Boucard et al. | 73/115 |
| 2007/0163329 A1 * | 7/2007 | Last et al. | 73/35.12 |
| 2007/0245805 A1 * | 10/2007 | Schricker et al. | 73/35.12 |
| 2007/0245806 A1 * | 10/2007 | Hirose et al. | 73/35.13 |

FOREIGN PATENT DOCUMENTS

| | | |
|---|---|---|
| DE | 196 80 912 | 10/1997 |
| EP | 1 096 141 | 5/2001 |
| FR | 2 845 462 | 4/2004 |

* cited by examiner

*Primary Examiner*—Eric S McCall
(74) *Attorney, Agent, or Firm*—Kenyon & Kenyon LLP

(57) ABSTRACT

A device for detecting the combustion-chamber pressure in an internal combustion engine is configured in such a way that the combustion-chamber pressure is able to be detected in a reliable and reproducible manner. To this end, a heating pin exposed to the combustion-chamber pressure is fixed in place in a housing of the glow plug with the aid of a fixation member. A sensor is affixed in the housing of the glow plug via a fixation element set apart from this fixation member. This sensor detects the elastic longitudinal expansion of the housing caused by the combustion-chamber pressure between the end of the fixation member facing the sensor and the fixation point of the fixation element on the housing. This device is preferably utilized in the automotive industry.

5 Claims, 1 Drawing Sheet

DEVICE FOR DETECTING THE COMBUSTION-CHAMBER PRESSURE IN AN INTERNAL COMBUSTION ENGINE

BACKGROUND INFORMATION

A device for detecting a combustion-chamber pressure in a diesel engine is described in German Patent No. DE 196 80 912, the device having a pressure sensor and a heating section of a glow plug. This heating section faces an interior of a cylinder of the diesel engine and is able to be acted upon by the combustion-chamber pressure. A fixation element fixes the heating section in place inside a housing of the glow plug. The pressure sensor is disposed between this fixation element and the heating section.

In this system the heating section embodied as a heating pin, and the pressure sensor is braced by the same fixation member with respect to the housing of the glow plug, so that the pressure sensor is acted upon by at least approximately the entire force acting on the heating pin. With certain sensor materials this has the disadvantageous result that the pressure sensor is also operated in its non-linear region, which leads to a non-reproducible measuring signal and an unreliable detection of the combustion-chamber pressure in the internal combustion engine.

Furthermore, the afore-described placement of the pressure sensor with its spatial proximity to the interior of the cylinder and its direct coupling to the heating pin during operation of the diesel engine has the disadvantage of entailing considerable thermal loading for the pressure sensor, so that it is at risk with regard to its operating reliability. In particular when the signal emission of the pressure sensor becomes unstable due to fluctuations between high and low operating temperatures, this may lead to malfunctions of the device for detecting the combustion-chamber pressure in the internal combustion engine, and thus also to an unreliable detection of the combustion-chamber pressure in the internal combustion engine.

SUMMARY OF THE INVENTION

The device according to the present invention has the advantage of avoiding the previously mentioned shortcomings in a satisfactory manner.

To this end, the sensor is positioned between the fixation member of the heating pin of the glow plug and a second end of the glow plug. This offers the possibility of decoupling the sensor from the full force acting on the heating pin and of operating it in its linear and low hysteresis region. Due to the separation between the fixation of the heating pin and the fixation of the sensor in the glow plug, the loading region of the sensor is able to be selectively restricted, so that the optimal region of the sensor in terms of signal technology may be utilized with a view toward reliable and reproducible detection of the combustion-chamber pressure in the internal combustion engine.

Furthermore, due to the sensor being set apart from the heating pin, and the thermal connection of the heating pin to the housing via its fixation, the thermal loading of the sensor is reduced so that it is less at risk in terms of its operating reliability, thereby making the recording of the combustion-chamber pressure in the internal combustion engine more reliable.

According to an advantageous development, the at least indirect force locking of the sensor with the fixation element is implemented with an initial stress. This counteracts a hysteresis effect in the measured-value acquisition.

Moreover, it is advantageous that the sensor is separated from the fixation member or the fixation element by at least one spacer element. Via its design and rigidity, the maximum force acting on the sensor is able to be adjusted.

In addition, it is advantageous if the at least one spacer element is formed as an intermediate sleeve, the sensor as a piezo ring, and the fixation element as a sleeve. This facilitates the feed-through of heating and signal lines for the sheathed-element glow plug or the sensor.

DETAILED DESCRIPTION

Figure 1:
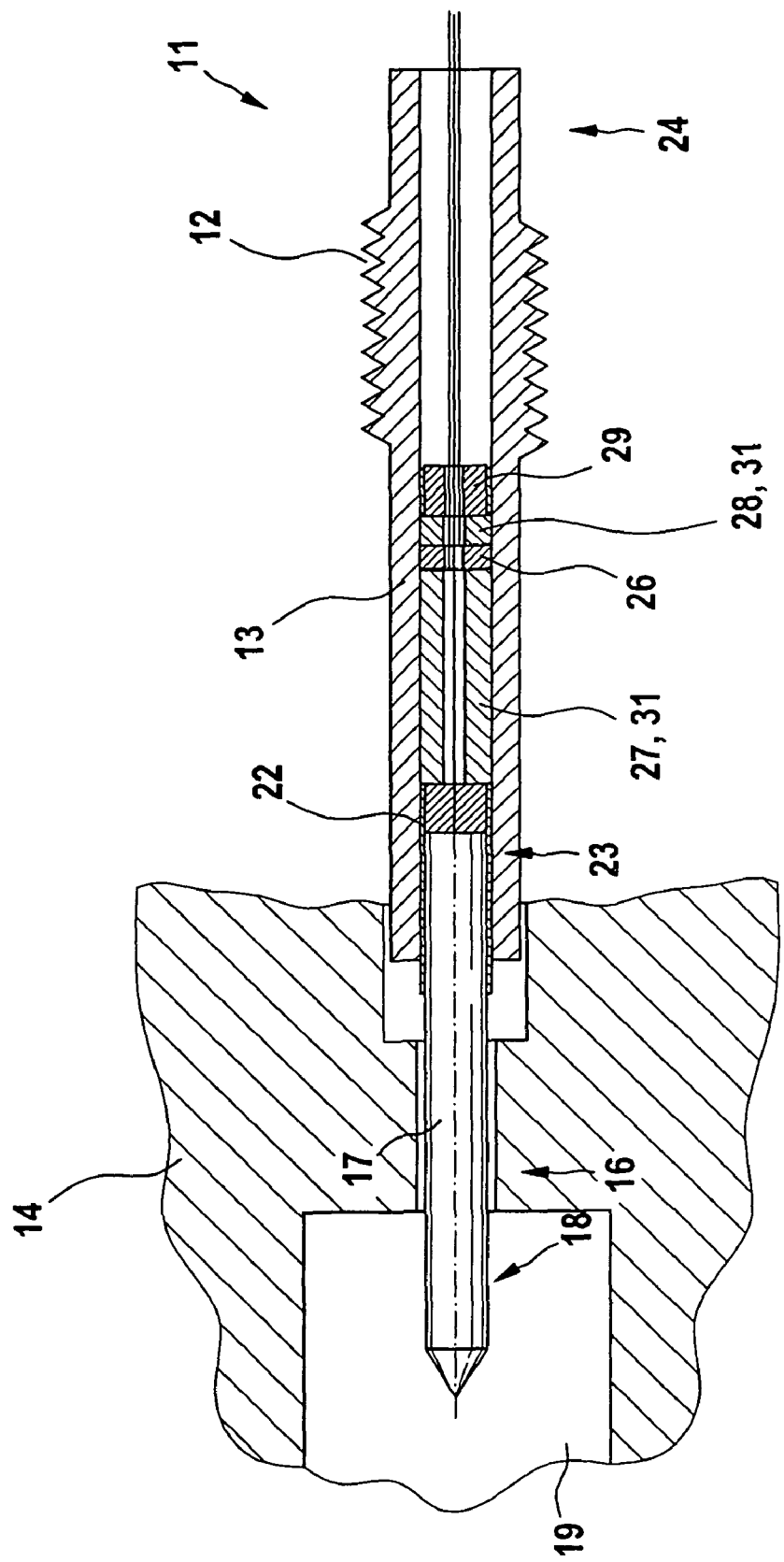
FIG. 1 shows the device for detecting the combustion-chamber pressure in an internal combustion engine in longitudinal section in a simplified view.

A device for detecting the combustion-chamber pressure in an internal combustion engine according to FIG. 1 includes a glow plug 11, which is installed in a cylinder head 14 (not shown further) of the internal combustion engine, in particular a diesel engine, with the aid of an external thread 12 of a tubular housing 13 made of metal.

At a first end 16, glow plug 11 has a heating pin 17, which partially projects from housing 13 and, via a free end 18, projects into an interior chamber 19, forming a combustion chamber, of the internal combustion engine. Heating pin 17 is fixed in place inside glow plug 11 by a fixation member 22. This fixation member 22 is in the form of a support tube, which, in an end region 23 of the other end of heating pin 17, tightly encloses it peripherally, fixation member 22 slightly projecting beyond the other end of heating pin 17. Fixation element 22 in turn is pressed into housing 13.

As an alternative, fixation member 22 could also be realized by a graphite sleeve, or in the form of an integral connection such as a welding connection, for example.

A sensor 26 is situated between fixation member 22 and second end 24 of glow plug 11. In the exemplary embodiment, sensor 26 is set apart from the facing end of fixation member 22 by a spacer member 27. As an alternative, sensor 26 could also rest directly against the facing end of fixation member 22.

On the other side in the exemplary embodiment, sensor 26 is braced on a fixation element 29 for sensor 24, a spacer element 28 being interposed, fixation element 29 being immovably situated in housing 13 and thereby defining the position of sensor 24 in housing 13. Fixation element 29 is embodied as a sleeve crimped inside housing 13, for instance, and as an alternative could also rest directly against sensor 26.

Spacer member 27 and spacer element 28 are each embodied in the form of an intermediate sleeve 31, which is preferably made of ceramic material or steel.

Contacting elements (not discussed in greater detail) in the form of electrical lines exit, which are provided, for instance, for the current supply of heating pin 17 on the one hand, and for transmission of the signals emitted by sensor 26 on the other hand.

The afore-described geometric arrangement of the important individual elements of the device for detecting the combustion-chamber pressure in an internal combustion engine is based on the following functions and effects.

During operation of the internal combustion engine, combustion gases occur in combustion chamber 19, which, due to their restricted expansion in combustion chamber 19, exert a pressure force on heating pin 17. The axial components of the pressure force, which are directed in the longitudinal direction of glow plug 11, endeavor to shift heating pin 17 toward second end 24 of glow plug 11. However, heating pin 17 is prevented from doing so by fixation member 22, which transmits these pressure forces to housing 13. The greatest portion of these forces is transferred into cylinder head 14 to which housing 13 is connected via external thread 12.

However, a portion of the pressure force on heating pin 17 on this force-transmission path leads to an elastic longitudinal deformation of housing 13 between the end of fixation member 22, which faces sensor 26, and the fixation point of fixation element 29 on housing 13. This deformation is absorbed by sensor 26, which in the exemplary embodiment is realized by way of example by a force or path sensor designed as piezo ring, for example. The signal emitted by sensor 26 may be correlated to the pressure in combustion chamber 19 via characteristic curves. In the ideal case, the signal emitted by sensor 26 is a variable that is proportional to the pressure in combustion chamber 19.

To detect the pressure in combustion chamber 19, sensor 26 may also be operated with prestressing so as to reduce hysteresis effects, for example. To this end, once heating pin 17 has been fixed in place on housing 13 by fixation member 22, sensor 26 is acted upon by a predefined force, which presses it against fixation member 22 even when the combustion engine is not operated, alternatively also only indirectly via interposed intermediate spacer member 27. This pre-force is maintained by fixation element 29 immovably supported in housing 13, or a spacer element 28 fixed in place on housing 13.

The maximum force on sensor 26 may be adjusted by the rigidity of housing 13, fixation member 22, or fixation element 29.

Due to the separation between fixation member 22 for heating pin 17 and fixation element 29 for sensor 26, it is possible to utilize the region of sensor 26 that is optimal from the standpoint of signal technology, so that a reliable and reproducible detection of the combustion-chamber pressure in the internal combustion engine is possible.

What is claimed is:

1. A device, comprising:
   a glow plug including a housing via which the glow plug is mounted inside a cylinder head of an internal combustion engine, the glow plug further including at a first end a heating pin that projects at least partially into a combustion chamber of the internal combustion engine when the glow plug is installed, the heating pin being affixed inside the glow plug with the aid of a fixation member; and
   a sensor situated in the housing between the fixation member and a second end of the glow plug, the sensor disposed separately from the heating pin, in a force locking manner between the fixation member and a fixation element implemented with prestressing, the fixation element being a sleeve crimped with the housing.

2. The device according to claim 1, wherein the sensor is a force sensor embodied as a piezo ring.

3. The device according to claim 1, wherein the sensor is separated from the fixation member by at least one spacer member.

4. The device according to claim 3, wherein the spacer member is an intermediate sleeve.

5. The device according to claim 4, wherein the intermediate sleeve is made of graphite.

\* \* \* \* \*